(12) United States Patent
Grannell et al.

(10) Patent No.: US 8,623,285 B2
(45) Date of Patent: *Jan. 7, 2014

(54) AMMONIA FLAME CRACKER SYSTEM, METHOD AND APPARATUS

(76) Inventors: Shawn Grannell, Ann Arbor, MI (US);
Donald E. Gillespie, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/537,125

(22) Filed: Jun. 29, 2012

(65) Prior Publication Data

US 2012/0276463 A1    Nov. 1, 2012

Related U.S. Application Data

(63) Continuation-in-part of application No. 13/370,910, filed on Feb. 10, 2012, which is a continuation-in-part of application No. 13/117,532, filed on May 27, 2011, now abandoned.

(60) Provisional application No. 61/348,898, filed on May 27, 2010, provisional application No. 61/419,490, filed on Dec. 3, 2010.

(51) Int. Cl.
*B01J 19/24* (2006.01)
*C01B 3/04* (2006.01)

(52) U.S. Cl.
USPC ......... 422/129; 422/198; 422/206; 423/237; 423/351; 423/658.2

(58) Field of Classification Search
USPC ........ 422/129, 198, 206; 423/237, 351, 658.2
See application file for complete search history.

(56) References Cited

U.S. PATENT DOCUMENTS

| 1,915,120 | A | | 6/1933 | Burke |
| 1,920,886 | A | * | 8/1933 | Pier et al. ............... 208/107 |
| 2,013,809 | A | | 9/1935 | Salisbury |
| 2,140,254 | A | | 12/1938 | Zavka |
| 2,264,693 | A | | 12/1941 | Gier |
| 2,519,696 | A | * | 8/1950 | Orr, Jr. .................. 422/655 |
| 2,578,193 | A | | 12/1951 | Marshall, Jr. |
| 2,601,221 | A | | 6/1952 | Rosenblatt |
| 2,606,875 | A | | 8/1952 | Rosenblatt |

(Continued)

FOREIGN PATENT DOCUMENTS

| WO | WO-2011/107279 | 9/2011 |
| WO | WO-2011/150370 | 12/2011 |

OTHER PUBLICATIONS

Kim, J. et al., A micro reforming system integrated with a heat-recirculating micro-combustor to produce hydrogen from ammonia, *International Journal of Hydrogen Energy*, 36(3): 1974-83, Dec. 8, 2010.

*Primary Examiner* — Jennifer A Leung
(74) *Attorney, Agent, or Firm* — Gifford, Krass, Sprinkle, Anderson & Citkowski, P.C.

(57) ABSTRACT

Apparatus, methods and systems reside in the decomposition of ammonia into a hydrogen-containing product mixture. An ammonia-rich gaseous mixture containing ammonia and oxygen enters a conduit, within which combustion and decomposition of the mixture is initiated, thereby liberating hydrogen. A mixture of products, resulting from the reactions, is expelled from the outlet of the conduit, the mixture including non-combusted hydrogen gas, which may then be used for other purposes. The incoming reactants, including ammonia and oxygen, are heat exchanged with the outgoing product mixture containing non-combusted hydrogen gas.

11 Claims, 10 Drawing Sheets

(56) References Cited

U.S. PATENT DOCUMENTS

| | | |
|---|---|---|
| 3,025,145 A | 3/1962 | Terpenning |
| 3,379,507 A | 4/1968 | Becker |
| 3,505,027 A | 4/1970 | Breitbach |
| 3,598,538 A | 8/1971 | Peacock |
| 4,069,071 A | 1/1978 | Normand |
| 4,157,270 A | 6/1979 | Martignoni et al. |
| 4,179,407 A | 12/1979 | Iiyama et al. |
| 4,219,528 A | 8/1980 | Normand |
| 4,478,177 A | 10/1984 | Valdespino |
| 4,750,453 A | 6/1988 | Valdespino |
| 4,755,282 A | 7/1988 | Samish et al. |
| 4,788,004 A | 11/1988 | Pinto et al. |
| 5,055,282 A | 10/1991 | Shikada et al. |
| 5,139,756 A | 8/1992 | Shikada et al. |
| 5,976,723 A | 11/1999 | Boffito et al. |
| 6,007,699 A | 12/1999 | Cole |
| 6,096,106 A | 8/2000 | Ruhl et al. |
| 6,299,847 B1 | 10/2001 | Allen |
| 6,488,905 B2 | 12/2002 | Graville |
| 6,800,386 B1 | 10/2004 | Wang et al. |
| 6,936,363 B2 | 8/2005 | Kordesch et al. |
| 7,527,661 B2 | 5/2009 | Chellappa et al. |
| 7,574,993 B2 | 8/2009 | Gillespie et al. |
| 2002/0056580 A1 | 5/2002 | Friebe et al. |
| 2005/0037244 A1 | 2/2005 | Goetsch et al. |
| 2006/0112636 A1 | 6/2006 | Chellappa et al. |
| 2007/0036707 A1 | 2/2007 | Dalla Betta et al. |
| 2011/0293510 A1* | 12/2011 | Grannell et al. ............ 423/658.2 |
| 2012/0148925 A1* | 6/2012 | Grannell et al. .............. 429/408 |

\* cited by examiner

AMMONIA FLAME CRACKER SYSTEM, METHOD AND APPARATUS

REFERENCE TO RELATED APPLICATIONS

This application is a continuation-in-part of U.S. patent application Ser. No. 13/370,910, filed Feb. 10, 2012, which is a continuation-in-part of U.S. patent application Ser. No. 13/117,532, filed May 27, 2011, which claims priority from U.S. Provisional Patent Application Ser. Nos. 61/348,898, filed May 27, 2010 and 61/419,490, filed Dec. 3, 2010, the entire content of each of which is incorporated herein by reference.

FIELD OF THE INVENTION

The present disclosure relates to the operation of ammonia crackers capable of producing hydrogen gas mixtures from ammonia, and more particularly to the operation of an Ammonia Flame Cracker (capitalized hereafter to distinguish the present invention from the prior art) capable of decomposing ammonia into hydrogen and nitrogen, using heat derived from combusting a portion of the ammonia.

BACKGROUND OF THE INVENTION

Due at least in part to high petroleum prices, environmental concerns, and future fuel availability, many internal combustion engine designers have looked to replace petroleum based fuels, e.g., gasoline and diesel, with other fuels for powering internal combustions engines. Desirably, by replacing fossil fuels, the cost of fueling internal combustion engines is decreased, harmful environmental pollutants are decreased, and/or the future availability of fuels is increased.

Ammonia is one such fuel capable of at least partially replacing petroleum based fuels. Ammonia ($NH_3$) is widely used in household cleaning supplies and agricultural fertilizer. Unlike either hydrogen or natural gas, ammonia need not be stored under extremely high pressures or at cryogenic temperatures to maintain the ammonia at a volumetric energy density that is appropriate for use in many propulsion applications such as automobiles and boats. Ammonia may be stored indefinitely as an anhydrous liquid at pressures nearly the same as those of propane, approximately 10 bars at 300 Kelvin. Ammonia has reasonable energy/volume and energy/mass densities, which, although lower as those of gasoline by factors of 2.6 and 2.3, respectively, are still well within reach of practical use in automobiles and other machinery as the principal energy carrier.

Ammonia may be made from nuclear power, which is characterized as having a high concentration of energy production per unit of land surface area. A high concentration of energy production is necessary because the costs, of owning or using land, and the purchase, repair and maintenance of production equipment, constitute a significant portion of the total cost of energy. Energy sources, that have a low concentration of energy production per unit of land surface area, may be limited in their capacity for eventual growth, by the availability of suitable land. Low-concentration energy sources may also be expensive, labor-intensive, and characterized by low or even negative, net energy or economic yield. Nuclear reactors have a high concentration of power, which is more than 1000 times greater than the 2-3 kilowatts per hectare gross average rate of liquid fuel production, which is typical for the biofuels. Therefore, fuel manufacturing, handling, distribution, and use are more feasible for ammonia than for some of the other fuels.

The use of ammonia as an energy carrier makes possible the indirect use of energy obtained from nuclear fission, in mobile applications where direct use would be impractical. In one example, high temperature nuclear reactor heat is used to drive a thermochemical cycle for generating hydrogen, and ammonia is made by combining the hydrogen with nitrogen. Hydrogen may be made from high temperature nuclear reactor heat, using the Sulfur-Iodine thermochemical cycle. Ammonia is then made from the hydrogen, using Haber-Bosch ammonia synthesis. A portion of the heat, released by the exothermic formation of ammonia, may be transferred from the Haber-Bosch ammonia synthesis loop to the endothermic hydrogen iodide decomposition process within the Sulfur-Iodine cycle, thereby rendering the combination, of Sulfur-Iodine thermochemical hydrogen production, and Haber-Bosch ammonia synthesis, more efficient for the production of ammonia, than these processes would be if run separately.

In another example, hydrogen is made by high temperature steam electrolysis, using a nuclear reactor to generate the required combination of heat and electricity. Again, ammonia is made from the hydrogen, using Haber-Bosch ammonia synthesis. A presentation, titled "Nuclear-Power Ammonia Production", presented at the 2006 Ammonia Fuel Conference by Kubic, discloses such a system. In the disclosed system, at least a portion of the heat, released by the exothermic formation of ammonia, is transferred from a Haber-Bosch ammonia synthesis loop to a superheater for a high temperature steam electrolysis unit, thereby rendering the combination, of high temperature steam electrolysis, and Haber-Bosch ammonia synthesis, more efficient for the production of ammonia, than these processes would be if run separately. The conversion of nuclear reactor heat to ammonia, by this or a similar system, may be as high as 48%, on a higher heating value basis, or 40% on a lower heating value basis. For further reading, see also a presentation, titled "Nuclear Ammonia—a Sustainable Nuclear Renaissance's 'Killer Ap'", presented at the 2011 Ammonia Fuel Conference, and authored by Siemer, Sorensen, and Hargraves.

Even when natural gas is the chosen source of primary energy used for making ammonia, the conversion, of natural gas to ammonia, may offer some advantages, over simply burning the natural gas directly, despite the conversion losses. Some vehicle applications specify the use of liquefied natural gas (LNG). The conversion of natural gas to LNG involves a large conversion loss, and LNG requires Dewar tanks and other means of handling, storing and using a cryogen. The use of LNG may also involve significant boil-off and transfer losses, and methane, the principal constituent of natural gas, is a potent greenhouse gas. Means for preventing these losses may be expensive. Also, natural gas and other hydrocarbons may produce carbon monoxide when burned. Therefore, ammonia has value as an engine fuel even when ammonia is made from natural gas. Ammonia derived from natural gas may also be less expensive than fuels derived from petroleum. Ammonia is especially valuable for use as a fuel for specialty engines and other appliances which may be safely operated while indoors. A hydrocarbon fueled engine may be run lean or use an exhaust catalyst to avoid carbon monoxide emissions. However, if the air/fuel ratio departs from its prescribed calibration, or if the catalyst becomes nonfunctional, then the hydrocarbon fueled engine may emit dangerously large quantities of carbon monoxide. Fuel stored as ammonia can be converted to hydrogen, using an Ammonia Flame Cracker. Hydrogen fueled engines, for which the fuel is stored as liquid ammonia, may now be used in applications for which battery/electric was previously the only option, such as forklifts which may be operated indoors. Even barbecuing indoors is feasible with the use of an Ammonia Flame Cracker and appropriate ventilation. For more information about barbecuing indoors, see the Ren and Stimpy episode "Superstitious Stimpy". The hydrogen could also be used as the combustion promoter for an engine fueled by mostly ammonia, according to U.S. Pat. No. 7,574,993, the entire content of which is incorporated herein by reference. Other applications include using the hydrogen as a lift gas for a balloon, or supplying the hydrogen to a hydrogen-SCR. For more information about the hydrogen-SCR, see the paper, titled "Low Temperature Hydrogen Selective Catalytic Reduction of NO on $Pd/Al_2O_3$", received Nov. 5, 2010, published in Revue Roumaine de Chimie, and authored by Mihet, et al.

Ammonia can be used as a means of storing and transporting hydrogen for use in various hydrogen-consuming applications disclosed herein or known to the art. In some instances, the costs of transporting hydrogen, and other usability concerns such as tank size and pressure, are sufficient to warrant the purchase of ammonia and the subsequent conversion of ammonia to hydrogen, using an Ammonia Flame Cracker, rather than the purchase of hydrogen as hydrogen. Ammonia may be stored, converted to hydrogen as needed in one of the Ammonia Flame Cracker embodiments disclosed herein, and finally purified and stored by means known to the art, possibly for later sale.

Like electricity, ammonia is an energy carrier which is made, with attendant conversion losses, from primary energy. Also like electricity, ammonia may be clean at the point of use, and it may also be made cleanly at the point of manufacture, through choice of primary energy. In some applications, ammonia will be preferred over batteries as the principal means of energy storage, for example, in automobiles and in fishing vessels. Battery/electric systems may be prohibitively expensive and batteries may weigh as much as, or much more, than the rest of the vehicle for an operating range that is currently typical for hydrocarbon fueled vehicles, for example automobiles which are expected to have a range of about 500 kilometers between refueling or recharging. The rechargeable lithium ion battery for a representative electric automobile has a specific capacity of about 53 watt-hours per kilogram for 65% capacity, or 81 watt-hours per kilogram for 100% capacity. If the 197 kilogram battery pack in the representative electric automobile were resealed from a driving range of about 56 kilometers, to a range of 500 kilometers, then the battery pack would have a mass of 1750 kilograms, which is greater than the mass of the rest of the car. Fishing vessels in the 10-20 ton range may carry 4000 liters or more of diesel fuel. For these boats, a rechargeable lithium ion battery would have a mass which is more than 10 times greater than the mass of the rest of the boat, for the same range, according to the battery specifications given for the representative automobile.

The plant-to-wheels efficiency of an energy chain consisting of, for example, a nuclear reactor equipped with means of making electricity from reactor heat, an electric transmission grid, a battery charger, a battery with attendant charge/discharge losses, and an electric motor with controller (battery/electric) may be either only marginally better or perhaps worse, than the plant-to-wheels efficiency of an energy chain consisting of a nuclear reactor equipped with means of making ammonia from reactor heat, an ammonia distribution network, and an ammonia-fueled internal combustion engine (ammonia/IC engine), the engine possibly incorporating one or more embodiments of the Ammonia Flame Cracker. Even for some cases in which the plant-to-wheels efficiency of battery/electric is substantially greater than the plant-to-wheels efficiency of ammonia/IC engine, ammonia/IC engine may still be preferred due to higher energy storage density, longer range, and lower total cost as compared to battery/electric. In several modern examples, the pre-subsidy price, of an automobile powered significantly by a battery/electric motor, is more than twice the price, of a comparable automobile powered solely by an internal combustion engine.

The "yellow coal" limit is the lower bound on the concentration of a fissionable element in rock deemed feasible for mining, such that the mass of rock at the yellow coal limit which must be handled is equal to the mass of coal which must be handled for the same gross energy yield. The "yellow coal" term has been applied to uranium (yellow cake, hence yellow coal), and for the enriched uranium/once through fuel cycle, the yellow coal limit is about 70 parts per million (ppm) by weight of natural uranium in rock. Calculations done for thorium fueled breeder reactors indicate a yellow coal limit of about 0.4 ppm by weight of thorium, which is much lower than the estimated 6-12 ppm average concentration of thorium in the earth's crust. Hence the potentially recoverable reserve of carbon-neutral primary energy, including thorium, which can be used for making both ammonia and electricity, is much, much larger than reserves of coal, oil and natural gas combined.

Ammonia crackers known to the art have difficulties and limitations because of large size and intricate design required for heat transfer, large quantities of sometimes expensive catalyst required to obtain a substantial ammonia decomposition yield, an uncontrolled and often low ammonia decomposition yield, and lack of rapid start capability. Ammonia crackers designed to use engine exhaust heat to decompose ammonia, such as the ammonia crackers disclosed in U.S. Pat. Nos. 2,140,254, 4,478,177, and 4,750,453, are large, expensive, or intricate devices which must be placed in the engine exhaust flow. Furthermore, an engine's exhaust gas temperature is generally not high enough to decompose any of the ammonia without using an ammonia cracker catalyst. Such cracker catalysts may be large and expensive when sized for providing enough catalytic sites for catalytically decomposing ammonia at a high rate or high decomposition yield. In some instances, an engine's exhaust gas temperature may not be high enough to give acceptable ammonia cracker performance even with the use of a catalyst.

Ammonia crackers may be designed to use electricity to decompose ammonia at high temperatures, including temperatures at which ammonia will decompose rapidly and at a high decomposition yield without the aid of a catalyst. The input and output of an electrically heated ammonia decomposer may be heat exchanged, and electricity can be used for resistive heating at any temperature for decomposing ammonia, the decomposition achieved possibly without the use of a catalyst. In one example, U.S. Pat. No. 3,598,538 discloses a heat exchanged, electrically powered ammonia decomposer, which may be operated at temperatures approaching 3000° F. (1649° C.) but more typically heats the ammonia to 1700° F. (927° C.). In another example, U.S. Pat. No. 2,578,193 discloses a heat exchanged, electrically powered, catalytic ammonia decomposer, which operates at 1200° F. (649° C.), and is said to be operable " . . . by unattended small children to produce a gas for the purpose of filling balloons.". Ammonia: It's "For The Children!". For this discussion the class of electrically powered ammonia decomposers is broadened beyond ammonia crackers using resistively heated elements, to include ammonia decomposers using electric arcs, electromagnetic energy such as microwaves, or electrolysis to decompose ammonia into hydrogen and nitrogen. However, the conversion of fuel energy into electricity, by an engine system, involves losses in the engine and losses in the generator. Electricity is thus, joule for joule, more costly to use for decomposing ammonia, than is heat obtained by combusting a portion of the ammonia. Ammonia Flame Crackers disclosed herein obtain energy for decomposing ammonia principally from the combustion of some of the ammonia and not from electricity. Therefore, an engine system, incorporating an Ammonia Flame Cracker, will be somewhat more efficient than an otherwise similar engine system incorporating an electrically powered ammonia decomposer.

Even for non-engine applications, it may be preferred to obtain the heat, required to decompose ammonia, by combustion of a portion of the ammonia or products of ammonia decomposition, rather than by electrical heating, because, in some instances, electricity may be more expensive than ammonia, and also because electrical heating may require an electrical hookup of very substantial capacity at the ammonia cracker, whereas heating by combustion does not. Furthermore, some applications may be remote. Other applications may be air-born, for example, carried on board balloons, and for these applications the use of very substantial quantities electrical energy may be forbidden.

Ammonia burners, disclosed in U.S. Pat. Nos. 5,904,910 and 6,488,905, can decompose ammonia non-catalytically by combustion of some of the ammonia with either pure oxygen, air, or some combination of oxygen and air. Air is defined herein as the natural mix of mostly oxygen and nitrogen which is neither enriched nor depleted in oxygen content, containing about 21% oxygen by volume on a dry basis. However, neither patent discloses a provision for heat exchanging the burner inputs and outputs, immediately before and after combustion and decomposition of ammonia in the burner. This exchange of heat is required for the efficient recovery of hydrogen from ammonia. Without heat exchange, ammonia can be fully combusted and decomposed with air and with pure oxygen at equivalence ratios of only about 1.5 and 2.5, respectively, when the initial temperature of the reactants is 25° C., and the adiabatic flame temperature is high enough, such that all of the ammonia decomposes in less than 1 second, or about 1500° C. The incorporation of a heat exchanger, which is claimed for the Ammonia Flame Cracker, confers a benefit to the non-catalytic ammonia burner, which is not disclosed in U.S. Pat. Nos. 5,904,910 and 6,488,905, for example, the full combustion and decomposition of ammonia with either air or with pure oxygen at equivalence ratios greater than 3. Ammonia Flame Crackers disclosed herein incorporate a provision for heat exchanging the reactants and products immediately before and after combustion and decomposition of the ammonia.

U.S. Pat. No. 2,013,809 discloses a catalytic ammonia cracker, which decomposes ammonia at an unspecified temperature. U.S. Pat. Nos. 2,601,221 and 2,606,875 describe catalytic ammonia combustion and/or decomposition at temperatures of 500° C. or higher, but these patents do not further disclose the rapid and substantially non-catalyzed decomposition of ammonia, which occurs at temperatures higher than about 1400° C. Other ammonia crackers, such as those disclosed in U.S. Pat. Nos. 1,915,120, 2,013,652, 2,161,746, 2,264,693, 2,578,193, 3,025,145, 3,379,507, 3,505,027, 4,069,071, 4,157,270, 4,179,407, 4,219,528, 4,755,282, 4,788,004, 5,055,282, 5,139,756, 5,976,723, 6,007,699, 6,299,847, 6,800,386, and 6,936,363, and U.S. Patent Application Document Nos. 20020028171, 20050037244, and 20060112636, operate at peak temperatures of 1200° C. or lower, and thus do not disclose the rapid and substantially non-catalyzed decomposition of ammonia, which only occurs at temperatures higher than 1400° C. Non-catalyzed decomposition of ammonia appears to be necessary for achieving a high ammonia decomposition yield. Without the non-catalytic decomposition of at least a portion of the ammonia, every ammonia molecule must contact a catalyst at least once before it can decompose. The fraction of ammonia molecules not contacting a catalyst can only be made arbitrarily small by using an arbitrarily large catalyst, there being an inverse relationship between the size of the catalyst and the fraction of non-decomposed ammonia. It is only through the non-catalyzed decomposition of at least a portion of the ammonia, which occurs rapidly only at temperatures higher than 1400° C., that a low fraction of non-decomposed ammonia can be achieved at a high throughput, without using a large catalyst. Ammonia Flame Crackers disclosed herein are operable to rapidly and non-catalytically decompose ammonia at peak temperatures higher than 1400° C.

U.S. Pat. No. 7,794,579 incorporates a heat exchanged, autothermal, catalytic ammonia reformer which may be operated within a temperature range of 200-2000° C., and preferably 400-1500° C. However, omission of the catalyst is not disclosed in U.S. Pat. No. 7,794,579, and no description is given for non-catalyzed ignition of ammonia at temperatures higher than 1200° C., or for the rapid and non-catalyzed decomposition of ammonia at temperatures higher than 1400° C. The temperature range, which is claimed for the Ammonia Flame Cracker, overlaps partially with the temperature ranges given in U.S. Pat. No. 7,794,579. However, the temperature range, which is claimed for the Ammonia Flame Cracker, is distinct and it confers at least one benefit to the heat exchanged, autothermal ammonia reformer, which is not disclosed in U.S. Pat. No. 7,794,579, for example, omission of the catalyst. Embodiments of the disclosed Ammonia Flame Cracker are operable to rapidly and non-catalytically decompose ammonia at peak temperatures higher than 1400° C., and where applicable, to also non-catalytically ignite ammonia, at temperatures higher than 1200° C.

Apparatus for cracking ammonia was disclosed by Lee, Park, and Kwon at the 2008 Ammonia Fuel Conference. The 2008 presentation, delivered on Sep. 29, 2008, is titled "Properties of Laminar Premixed Hydrogen-Added Ammonia/Air Flames". Additional apparatus for cracking ammonia was reported by Kwon, Joo, Lee, and Um at the 2011 Ammonia Fuel Conference. The 2011 presentation, delivered on Sep. 19, 2011, is titled "Reforming and Burning of Ammonia in Micro Hydrogen and Power Generation Systems". The combined combustor/reformers, shown in these two presentations, appear similar to Ammonia Flame Cracker embodiments with separate ammonia combustion and decomposition conduits. However, neither of these two presentations specifies a temperature range for non-catalyzed ammonia decomposition. In particular, no specification is given for the use of temperatures higher than 1200° C., for non-catalyzed ignition of ammonia, or higher than 1400° C., for non-catalyzed decomposition of ammonia.

Based on the foregoing, there is a need for a heat exchanged device for non-catalytically decomposing ammonia into a hydrogen-containing product mixture by combustion of some of the ammonia, said device being characterized as compact and capable of rapidly decomposing ammonia at a high decomposition yield, and at a high overall thermal conversion efficiency.

SUMMARY OF THE INVENTION

This invention relates to the decomposition of ammonia into a hydrogen-containing product mixture. A method of cracking ammonia in accordance with the invention comprises flowing ammonia and air into a heat exchanged conduit. Combustion and decomposition of the mixture occurs within the conduit. A mixture of gaseous products resulting from the reaction is expelled from the outlet of the conduit, the mixture including non-combusted hydrogen gas, which may then be used for other purposes.

The decomposition of the ammonia occurs within the gaseous phase and at a temperature high enough for rapid and non-catalyzed decomposition of the ammonia. The mixture of gases exiting the outlet of the conduit may typically contain up to about one half hydrogen by volume. Ammonia and air may be combusted and decomposed at an equivalence ratio which is substantially higher than the rich flammability limit for ammonia in the mixture.

An Ammonia Flame Cracker, constructed in accordance with the invention, includes a conduit having a first inlet for receiving ammonia, and a second, separate inlet for receiving a gas mixture containing oxygen, possibly air. The ammonia and air are preheated separately en-route to a combustion zone, wherein the ammonia and air mix and react, thus forming a hydrogen-containing product mixture. The preheating is achieved by counterflow heat exchanging the incoming ammonia and air with the outgoing hydrogen-containing product mixture. The outlet of the conduit expels the product mixture including non-combusted hydrogen gas. A representative independent claim follows:

An ammonia cracker, comprising:

a conduit having a first inlet for receiving ammonia, and a separate, second inlet for receiving an oxygen-containing gas mixture;

a combustion zone;

wherein the ammonia and the oxygen-containing gas mixture are metered separately into the combustion zone and burned at a maximum gas temperature higher than 1400 Celsius, thus forming a mixture of products;

apparatus for heating at least the incoming ammonia;

wherein the apparatus for heating includes a counterflow heat exchanger within the conduit;

wherein at least a portion of the heating results from a transfer of heat, from the outgoing mixture of products, to the incoming ammonia; and an outlet for expelling the mixture of products, resulting from the reactions, from the conduit, the mixture of products including non-combusted hydrogen gas.

An additional embodiment of the Ammonia Flame Cracker includes a conduit having an inlet for receiving a mixture containing ammonia and air. The incoming mixture is heated by counterflow heat exchange with the outgoing hydrogen-containing product mixture. This heating causes the incoming mixture to ignite and react. The outlet of the conduit expels the product mixture including non-combusted hydrogen gas.

In yet another embodiment of the Ammonia Flame Cracker, a fuel is combusted with air within a first exothermic conduit of a heat exchanger, and ammonia is at least partially decomposed into hydrogen and nitrogen within a second, separate endothermic conduit of the same heat exchanger. The fuel may be ammonia, products of ammonia decomposition, or another fuel stored separately from the ammonia. The fuel and air enter the first conduit and are preheated separately until they reach a combustion zone, wherein the fuel and air mix and combust. The ammonia entering the second conduit is heated, and the ammonia is at least partially decomposed into hydrogen and nitrogen. The combusted products exiting from the first conduit are discarded or used elsewhere, and the hydrogen-containing gas mixture exiting from the second conduit may be used for any of the various applications disclosed herein or known to the art.

Surfaces, of Ammonia Flame Crackers disclosed herein, which are not intended to function as catalysts, may be incidentally catalytic. A catalyst may or may not be included in any Ammonia Flame Cracker disclosed herein. A catalyst may be incorporated into a starting apparatus for an Ammonia Flame Cracker, the starting apparatus being activated only while an Ammonia Flame Cracker is being warm-up to operating temperature. Nonetheless, peak gas temperatures higher than 1400° C. are used by all Ammonia Flame Crackers disclosed herein, such that the operation is dominated by non-catalytic, gaseous phase decomposition of ammonia.

DETAILED DESCRIPTION OF THE PREFERRED EMBODIMENTS

Typically, air is used as the oxidizer for combusting a portion of the ammonia. Embodiments of the Ammonia Flame Cracker are thus generally operable with ammonia and air as the only inputs, and without the use of air separating equipment. The use of pure oxygen instead of air is allowed, but not required. Most generally, oxygen is among the reactants, because any mixture containing air also contains oxygen. The total ammonia and air reaction, for which a full ammonia decomposition yield is assumed, is described by the following equation:

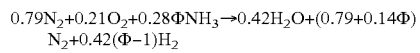

$\Phi$=ammonia/air equivalence ratio, and $\Phi$>1

An equivalence ratio may be chosen such that, when the ammonia combustion and decomposition reactions are run to completion, the heat released by the formation of water equals the heat absorbed by the decomposition of ammonia, and the mixture undergoes zero temperature change when it reacts. The reaction progresses without the external application of heat, and is thus an autothermal reaction. This limiting theoretical case assumes zero heat loss, and the use of a perfect counterflow heat exchanger for preheating the incoming ammonia and air up to the reaction temperature, using only the heat which can be extracted from the outgoing hydrogen-containing product mixture. The theoretical limits of efficiency and yield are unaffected by the use of pure oxygen instead of air.

Figure 1:
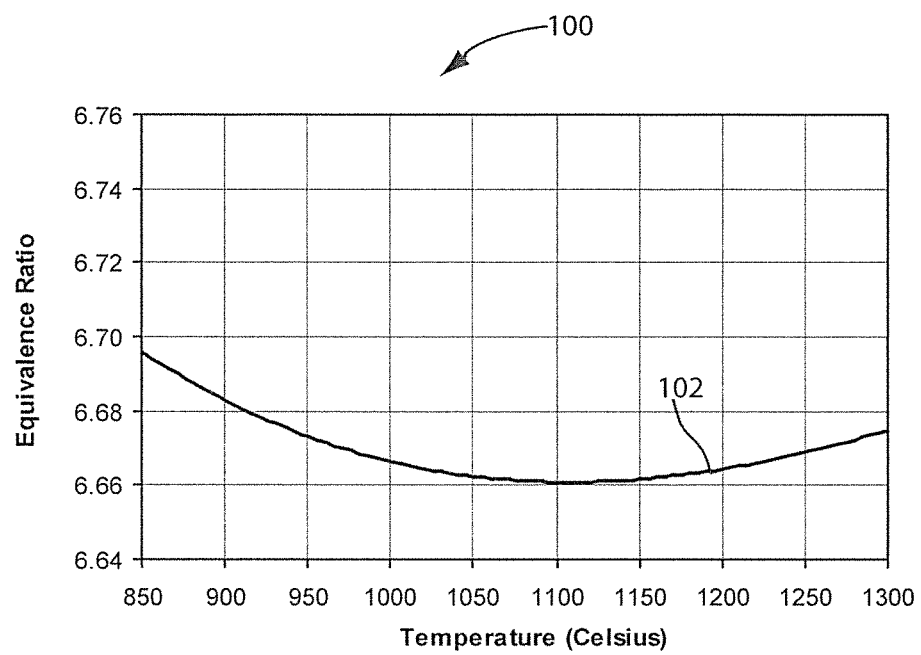
FIG. 1 is a graph of equivalence ratios, used for the calculation of a theoretical upper performance limit.

Referring to FIG. 1, a graph 100 is shown, of a curve 102 which is used for calculating a theoretical upper performance limit of an Ammonia Flame Cracker incorporating an ideal counterflow heat exchanger. Curve 102 shows ammonia/air equivalence ratios for which the quantity of heat, released by the exothermic formation of water, is just sufficient to decompose all of the ammonia at a constant temperature, for each temperature. The enthalpies of formation of ammonia, water, or any other compound vary with temperature because, over a given temperature range, the total heat capacities of the reactants and products, in any given chemical equation, are not generally the same. Each equivalence ratio on curve 102 is 1.5 times the molar enthalpy of formation of water, divided by the molar enthalpy of formation of ammonia. The enthalpy of formation assigns a value of zero to pure chemical elements in their usual form, for example, diatomic hydrogen.

Non-catalyzed ammonia decomposition occurs at a rate which increases exponentially with increasing temperature. Experimental measurements of the non-catalyzed ammonia decomposition rate indicate that about 1% of the ammonia decomposes in 1 second at 1150° C. It appears that ammonia does not appreciably decompose in less than 1 second at temperatures lower than 1150° C. Curve 102 has a minimum of 6.66 at about 1100° C. At the minimum in curve 102, the total heat capacities of the products and reactants are equal. For an Ammonia Flame Cracker incorporating an ideal counterflow heat exchanger, the temperatures of the products and reactants could be equal where the total heat capacities are equal, at about 1100° C. Curve 102 has a negative slope for temperatures lower than about 1100° C., indicating that the total heat capacity of the product mixture is greater than the total heat capacity of the reactants. Therefore the product mixture contains more than enough heat to preheat the reactants from ambient temperature, to 1100° C., for a wide range of ambient temperatures.

However, the reactants must also complete the excursion from 1100° C., to a temperature at which ammonia decomposes non-catalytically at a high rate. Curve 102 has a weakly positive slope for temperatures higher than about 1100° C., indicating that the total heat capacity of the reactants is very slightly greater than the heat capacity of the product mixture. The effect of this slight heat capacity difference, on the reaction energy balance, can be exactly compensated by using the ammonia/air equivalence ratio=6.66 for a wide range of ammonia decomposition temperatures.

The theoretical upper performance limit, for an Ammonia Flame Cracker incorporating an ideal counterflow heat exchanger, thus corresponds to a full ammonia decomposition yield, and an ammonia-to-hydrogen conversion efficiency of 97.3% on a lower heating value (LHV) energy basis, obtained at an equivalence ratio of 6.66. This is as good, as an Ammonia Flame Cracker can be.

If the reactants are ammonia and air, then the theoretical upper performance limit will correspond to a product mixture containing about 52% hydrogen by volume on a wet basis, or 58% on a dry basis. If pure oxygen is used instead of air, then the theoretical upper performance limit will correspond to a product mixture containing about 64% hydrogen by volume on a wet basis, or 72% on a dry basis.

Figure 2:
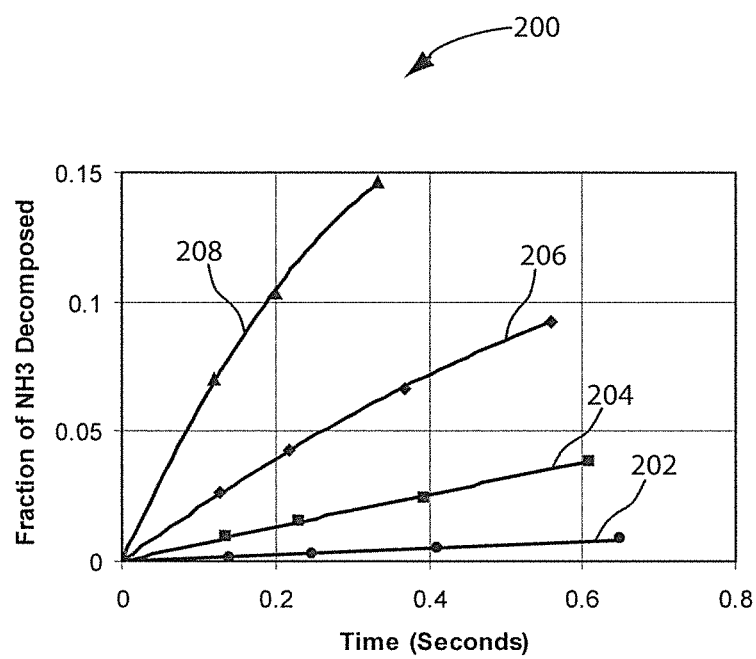
FIG. 2 is a graph showing the rate of non-catalyzed ammonia decomposition at a low decomposition yield.

Referring to FIG. 2, a graph 200 is shown, of the fraction of pure ammonia decomposed, as a function of residence time in a heated, non-catalytic chamber. Curves 202, 204, 206 and 208 correspond to temperatures of 1156° C., 1215° C., 1272° C., and 1315° C., respectively, and a pressure of 1 bar. Ammonia appears to decompose at an approximately constant rate at a given temperature, from zero decomposition, up until about 0.05 (5%) of the ammonia is decomposed. Thereafter, the rate of ammonia decomposition declines. The rate of decline can clearly be seen near 10%, and the decline is faster than can be explained by simple exponential decay of the ammonia.

Figure 3:
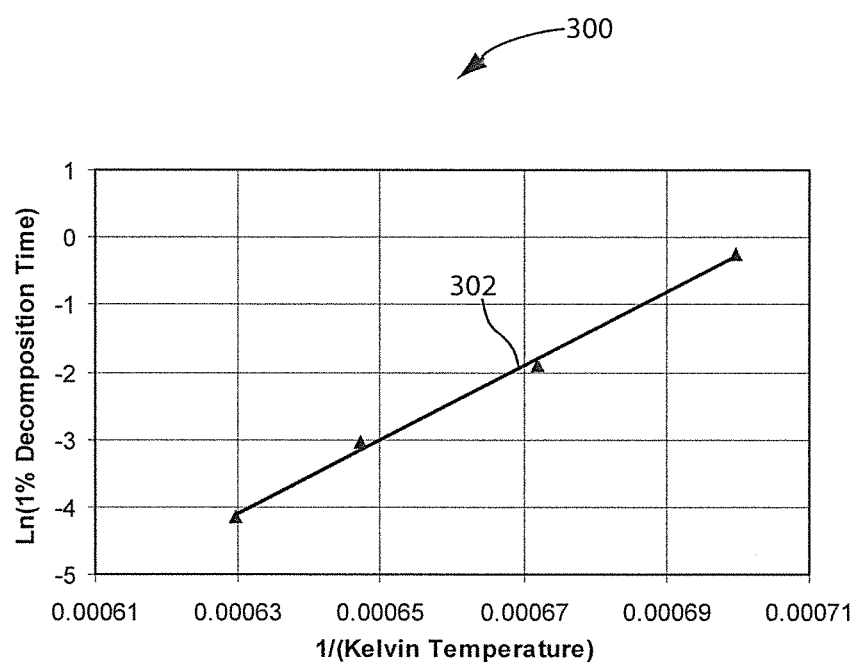
FIG. 3 is a graph showing the temperature trend for the time required to decompose 1% of the ammonia.

Referring to FIG. 3, a graph 300 is shown, of the temperature trend, for the time required to decompose 1% of the ammonia. The data for line 302 are based on the results shown in graph 200. The Ln( ) function is the base e logarithm, where e≈2.718, and the Ln( ) function is defined to be zero when the time is 1 second. The temperature range shown is about 1150-1320° C. The time required to decompose 1% of the ammonia is about 1 second at 1150° C. The slope of line 302 indicates that, when the fraction of ammonia decomposed is small, the apparent activation energy for the non-catalyzed decomposition of ammonia is about 455 kilojoules per mole of ammonia.

This activation energy of 455 kilojoules per mole is very nearly equal to the enthalpy change, for breaking the first of the three H—N bonds of the ammonia molecule. The enthalpy change for breaking the first H—N bond is about 444 kilojoules per mole of ammonia at 0 Kelvin, and about 462 kilojoules per mole near 1500-2000 Kelvin. Ammonia molecules undergo a series of intermediates including $NH_2$, NH and N, wherein the transition from $NH_3$ to $NH_2$ involves the largest enthalpy change, and is thus the rate-limiting step. The transition, to subsequent intermediates and then finally to hydrogen and nitrogen, appears to be relatively much faster.

Figure 4:
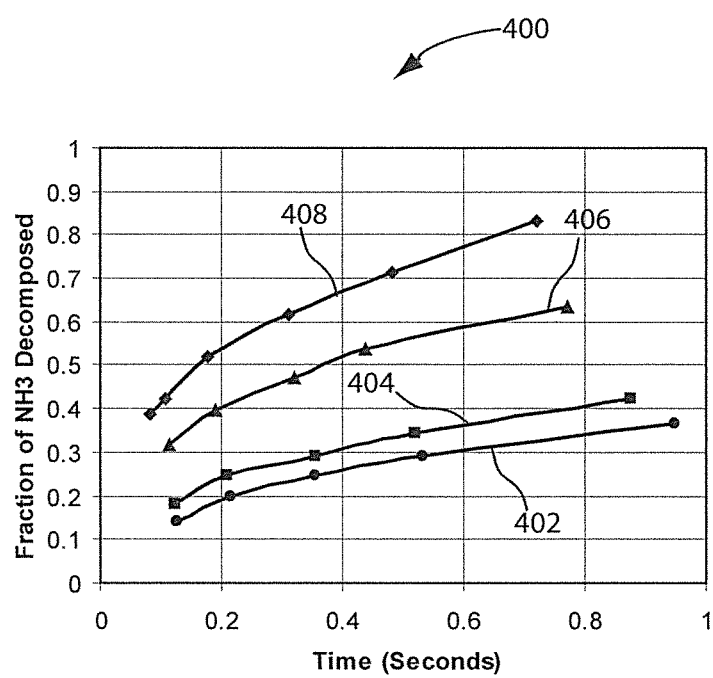
FIG. 4 is a graph showing the rate of non-catalyzed ammonia decomposition at a high decomposition yield.

Referring to FIG. 4, a graph 400 is shown, which contains additional data on the decomposition of pure ammonia, at a higher range of decomposition yields than the range shown in graph 200. Curves 402, 404, 406 and 408 correspond to temperatures of 1361° C., 1373° C., 1420° C., and 1455° C., respectively, and a pressure of 1 bar. The fraction of ammonia decomposed is approximately proportional to the cube root of time, and the overall reaction rate is exponentially dependent on temperature. The cube-root function is a solution to a differential equation, wherein the instantaneous rate of ammonia decomposition is inversely proportional to the square of the fraction of ammonia decomposed.

Figure 5:
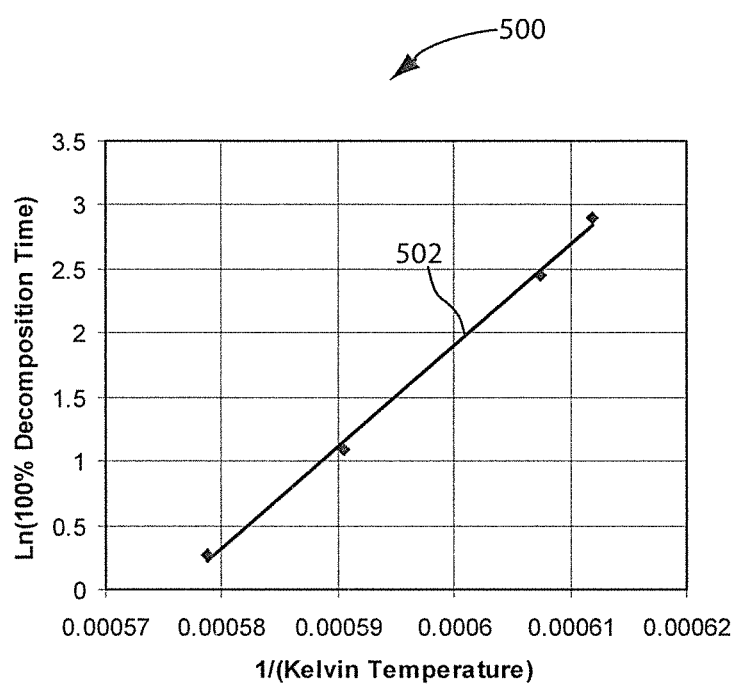
FIG. 5 is a graph showing the temperature trend for the time required to decompose 100% of the ammonia.

Referring to FIG. 5, a graph 500 is shown, of the temperature trend, for the time required to decompose 100% of the ammonia. The data for line 502 are based on the results shown in graph 400. Again, the Ln( ) function is the base e log, where e≈2.718, and the Ln( ) function is defined to be zero when the time is 1 second. The temperature range shown is about 1360-1460° C. The time required to decompose 100% of the ammonia is about 1 second at 1460° C. The slope of line 502 indicates that, when the fraction of ammonia decomposed is large, the apparent activation energy for the non-catalyzed decomposition of ammonia is about 657 kilojoules per mole of ammonia.

This activation energy of 657 kilojoules per mole is nearly halfway, between the enthalpy change for breaking the first of the three H—N bonds of the ammonia molecule, and the enthalpy change for breaking both the first and second of the three H—N bonds. The enthalpy change for breaking both the first and second H—N bonds is about 830 kilojoules per mole of ammonia at 0 Kelvin. The approximate inverse square dependence of the ammonia decomposition rate, on the concentration of hydrogen in the mixture, suggests that molecular hydrogen is recombining with two of the intermediates, with $NH_2$ being the most energetically favored, and NH being the second most energetically favored, for recombination back down to $NH_3$ and $NH_2$, respectively. It appears that the larger activation energy of 657 kilojoules per mole is required, to overcome the recombination of ammonia-related intermediates when molecular hydrogen is present. Water may also participate in this recombination, but probably to a much lesser extent.

Figure 6:
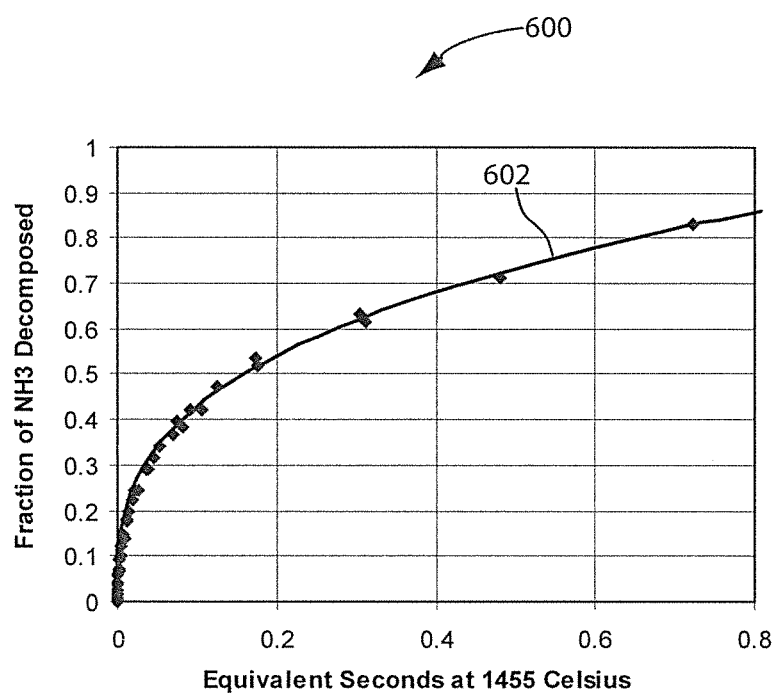
FIG. 6 is a graph showing the general form of non-catalyzed ammonia decomposition, as a function of time.

Referring to FIG. 6, a graph 600 shows the general curve of ammonia decomposition, as a function of time. The data are graphed on an equivalent time axis, wherein a longer time spent at a lower temperature, is equivalent to a shorter time spent at a higher temperature. The time resealing is normalized to 1455° C., such that at 1455° C., the resealed time is the actual time. In one example, for the previously determined activation energy of 657 kilojoules per mole, 1 second, spent at 1420° C., is equivalent to about 0.389 seconds, spent at 1455° C. A similar resealing of time, based on the activation energy of 657 kilojoules per mole, collapses all of the decomposition data, from graphs 200 and 400, into a single curve 602. Curve 602 is 0.924, multiplied by the cube root of the time in equivalent seconds spent at 1455° C., which is the best fit to the data, for the range shown. Curve 602 approaches 1 (100%) in 1.27 seconds. Therefore, ammonia fully decomposes non-catalytically in about 1.27 seconds at 1455° C., or about 3.26 seconds at 1420° C., etc. when the pressure is 1 bar. The frequency of collisions between gas molecules is proportional to pressure. A higher collision frequency, and thus a higher ammonia decomposition rate at a given temperature, or a slightly lower temperature at a given ammonia decomposition rate, may be thus achieved by the use of elevated pressures. Residence time is also proportional to pressure for a given throughput and set of dimensions. The dimensions of an Ammonia Flame Cracker could thus be made smaller for a given residence time and throughput, if elevated pressures are used. Near 100% decomposition of the ammonia may be achieved in practice, even at elevated pressures of perhaps 10 bars, because less than one millionth of the ammonia survives intact in an equilibrium mixture at 1400° C. and a pressure of 10 bars.

Figure 7:
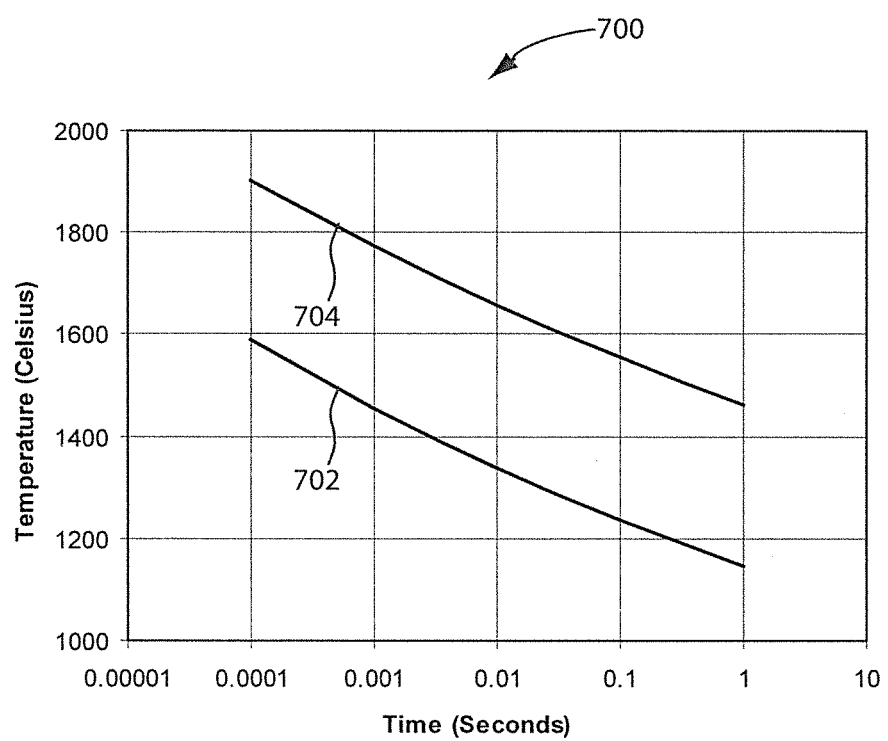
FIG. 7 is a graph showing the temperatures required for ignition and for full ammonia decomposition.

Referring to FIG. 7, a graph 700 shows the combinations of time and temperature required for ignition 702 and full decomposition 704 of ammonia at a pressure of 1 bar. It is an object of the present invention, to non-catalytically decompose ammonia, at a high decomposition yield, and within a reasonable time. Ignition and decomposition times, that are longer than 1 second, are burdensome from the standpoint of design. An Ammonia Flame Cracker becomes large for a given throughput when either of these times is longer than 1 second, and heat loss also becomes comparatively large. Therefore, peak gas temperatures higher than 1400° C. are required to obtain even a partial ammonia decomposition yield. How much higher, depends on dimensions and throughput, which in turn determine the ignition time and holding time at peak temperature. Representative examples are given.

Ignition occurs in a premixed ammonia/air mixture when enough ammonia decomposes and combusts during an ignition time, such that the temperature rise, due to combustion at the initial rate during that ignition time, increases the ammonia decomposition rate by a factor of e, where e≈2.718. Over a wide range of temperatures of interest, the ammonia decomposition rate increases by a factor of e for every 40-50° C. temperature increase. For ammonia/air equivalence ratios in the neighborhood of 6 or more, a temperature increase of 40-50° C. is yielded when about 1% of the ammonia decomposes and combusts adiabatically. Therefore, about 1% of the ammonia must decompose during the ignition time. Ignition curve 702 is thus derived from an extrapolation of line 302 in graph 300.

The ignition time is the distance traversed across a 40-50° C. rise in the heat exchanger, divided by the gas velocity. In one example, a heat exchanger has a temperature gradient of about 40-50° C. per centimeter down the length, and a gas velocity of 10 meters per second in the ignition region. The ignition time is 0.001 seconds, and the mixture will ignite at 1460° C., according to the ignition curve 702. In another example, a heat exchanger has a temperature gradient of about 40-50° C. per 2 centimeters down the length, and a gas velocity of 2 meters per second in the ignition region. The ignition time is 0.01 seconds, and the mixture will ignite at 1340° C., according to the ignition curve 702. In both examples, which are considered typical, the ignition temperature is higher than 1200° C.

Regarding ignition, the principal assumption is that only ammonia, that has decomposed, can be burned. Oxygen may attack ammonia directly, so it is possible that the ammonia could ignite in portions of the region below curve 702. The ignition curve 702 is thus an upper bound on combinations of time and temperature that a rich, premixed ammonia/air mixture could be expected to tolerate, without igniting. Separately metered ammonia and air components are guaranteed to ignite upon mixing, for combinations, of preheat temperature and holding time, within the region, on or above the ignition curve 702.

The full decomposition curve 704 defines a region, of holding time and peak temperature, sufficient to fully decompose ammonia. Curve 704 is thus derived from an extrapolation of line 502 in graph 500. In one example, all of the ammonia is decomposed when the ammonia is held at a peak temperature of about 1770° C. for 0.001 seconds. In another example, all of the ammonia is decomposed when the ammonia is held at a peak temperature of about 1660° C. for 0.01 seconds. In yet another example, all of the ammonia is decomposed when the ammonia is held at a peak temperature of about 1560° C. for 0.1 seconds, according to curve 704. In all three examples, which are considered typical, the temperatures required for full decomposition of the ammonia are higher than 1400° C. A temperature range of about 1500-1800° C. appears to be appropriate for fully decomposing ammonia in about 1-100 milliseconds.

The presence, of relatively inert molecules from the air and from combustion, should tend to increase the ammonia decomposition rate relative to that of pure ammonia, because the ammonia intermediates will collide with relatively fewer hydrogen molecules and more inert molecules, and thus experience a lower probability of recombination with hydrogen. The temperatures required for complete ammonia decomposition, at a given holding time, may thus be somewhat lower than those shown on curve 704. The region on or above curve 704 is a region of holding times at peak temperatures, guaranteeing a full ammonia decomposition yield for a wide range of reactant compositions.

Figure 8:
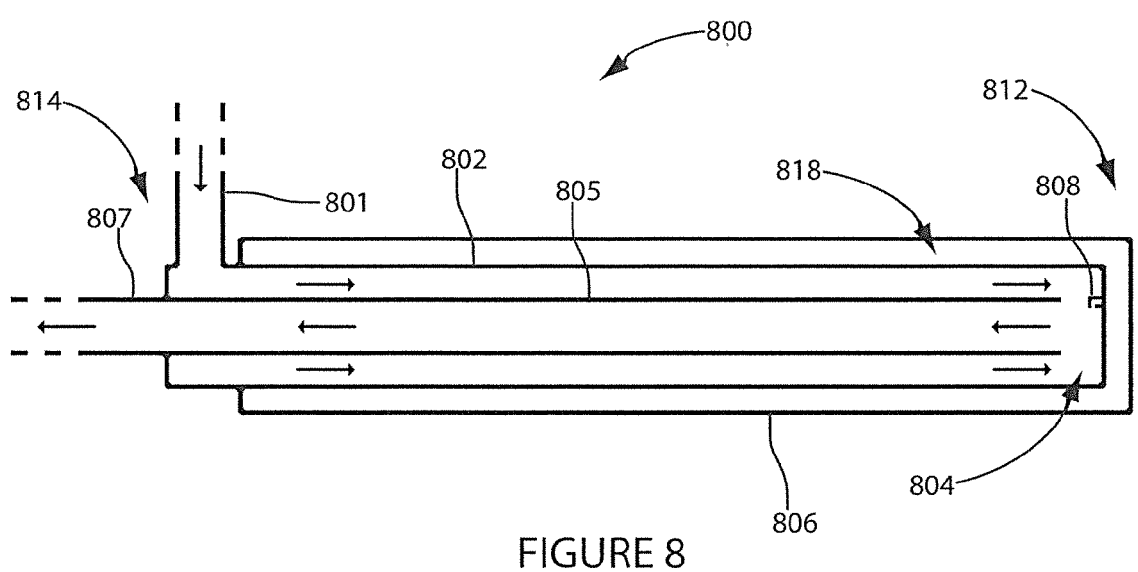
FIG. 8 is a schematic diagram of a heat exchanged Ammonia Flame Cracker, according to one representative embodiment.

Referring to FIG. 8, according to one embodiment, an Ammonia Flame Cracker 800 includes concentric, round tubings 802, 805, and 806, and an igniter 808. The igniter 808 may be a spark gap, a traveling flame, or any of the other various igniters known to the art. A flammable starting mixture, possibly containing hydrogen and air, or ammonia and pure oxygen or oxygen-enriched air, may be metered into inlet 801, ignited by the igniter 808, and burned in region 804, and the burned gases may be purged through toward end 814, thus warming surfaces within the Ammonia Flame Cracker 800 up to operating temperature. In some cases, the leftover hydrogen, contained in this burned starting mixture, may be applied to further uses during warm-up. After warm-up is achieved, operation may revert to a rich mixture of ammonia and air entering inlet 801. Otherwise, an electric heater (not shown) may be used for warming surfaces of the Ammonia Flame Cracker 800 up to operating temperature.

The tubings 802 and 805 are joined near end 814 and constructed of materials, for example, aluminum oxide or sapphire, chosen to withstand the high temperature and the chemical environment of a combusting ammonia/air mixture, and also for appropriate electrical and thermal properties. The Ammonia Flame Cracker 800 preheats a rich, premixed ammonia/air mixture to an ignition temperature within the space between tubings 802 and 805. This preheating is achieved by heat exchange, using the sensible heat contained in the outgoing hydrogen-containing product mixture. This transfer of heat, from the outgoing hydrogen-containing product mixture, to the incoming ammonia/air reactant mixture, occurs by heat conduction and/or radiation through the walls of tubing 805. Surfaces contacting the mixture in the space between tubings 802 and 805, upstream of the turnaround region 804, should preferably be selected or treated so as to be non-catalytic, thus preventing the mixture from igniting before it is preheated to the maximum extent possible.

A rich, premixed ammonia/air mixture enters the Ammonia Flame Cracker 800 through inlet 801 and travels through the space between tubings 802 and 805. The ammonia/air mixture reacts upon reaching the ignition temperature somewhere within the space between tubings 802 and 805, thus becoming a hydrogen-containing product mixture. The mixture may be kept at peak temperature in the turnaround region 804 for a partial holding time, which is determined by the mixture throughput and the dimensions of region 804. The total holding time is also affected by the dimensions chosen for other components of Ammonia Flame Cracker 800. Finally, the hydrogen-containing product mixture travels toward exit 807, through the space inside tubing 805, and leaves the Ammonia Flame Cracker 800 through exit 807. The small arrows show the direction of flow. The Ammonia Flame Cracker 800 is operable with the flow going in the direction opposite of that described.

Tubing 806 is joined to tubing 802 near end 814 and it forms the outer wall of a vacuum jacket, and tubing 802 forms the inner wall of this same vacuum jacket. Vacuum space 818 is thus bounded by the inner surface of tubing 806 and the outer surface of tubing 802. This vacuum space prevents conductive and convective heat loss from Ammonia Flame Cracker 800. Tubing 806 may be constructed of materials that are forbidden for use near end 812 of tubings 802 and 805. For example, some portions of tubings 802 and 805, especially portions near end 812, must be constructed of materials that can withstand temperatures near 1400° C. or higher, whereas tubing 806 may be constructed of materials that may melt at this temperature, for example, glasses, metals, and high reflectivity coatings that melt at temperatures lower than 1400° C. The inner surface of tubing 806 may be coated with a metal film, for example gold, silver, copper or aluminum, which has a high average reflectivity for blackbody radiation at 1400° C. The high reflectivity coating on the inner surface of tubing 806 reduces radiative heat loss from tubing 802, and also helps to keep tubing 806 relatively cool.

The portions of the outer surface of Ammonia Flame Cracker 800 may be fitted with cooling fins (not shown), a fan (not shown) or constructed from/coated with a material chosen for a high average emissivity for blackbody radiation near ambient temperature, which will further cool tubing 806 and end 814, and reduce the thermal stresses on all tubings and any of their joints and coatings. Tubing 802 may be constructed of or coated with a diffusely reflective material so as to reduce its effective emissivity. The aspect ratio and materials of the Ammonia Flame Cracker 800 may be chosen to minimize radiative and conductive heat transfer down the length. Tubings 802 and 805 may be constructed of materials that are only moderately thermally conductive, such as sapphire or aluminum oxide, so as to avoid excessive thermal conduction down the length. The outer surface of tubing 802 may also be constructed of, or coated or covered with, possibly reflective materials that have a very low vapor pressure at 1400° C. so as to minimize contamination of the vacuum space 818, and to avoid substantial contamination of any reflective coatings. Further insulation on the outside of tubing 806 only serves to raise the temperature of tubing 806, and has minimal impact on the rate of net heat loss from tubing 802.

A heat exchanger geometry, possibly differing from that shown in 800, may be chosen to improve heat exchange or to impede heat loss. For example, multiple tubings 805 may be housed within tubing 802. In another example, a matrix with hollow channels a few millimeters wide may be used instead of the single tubing 805. Such a matrix may contain, for example, an N by N array of square channels. Adjacent channels may alternate between connection to reactant entry 801 and product exit 807, in a checkerboard pattern. Any other Ammonia Flame Crackers disclosed herein may be similarly expanded into multiple channels, or use a geometry that differs from the particular examples shown.

The inlet 801 may be positioned off-center for the purpose of imparting swirl flow in the region between tubings 802 and 805. Other measures such as fins and turbulent elements (not shown) and choice of material for tubing 805 may also facilitate the heat exchange process. A temperature gradient exists along the length of the Ammonia Flame Cracker 800, such that end 812 may have a temperature of about 1400° C., or higher, and the end 814 with the reactant entry 801 and product exit 807 may have a temperature of, for example, lower than about 500° C. Materials and fabrication methods used in the construction and joining of tubings 802 and 805, and tubings 802 and 806, may thus be permitted at end 814, which may not be permitted at end 812, for example, o-rings, metals, glasses, adhesives, and glass-to-ceramic seals.

Ammonia Flame Cracker 800 is inherently stable in its operation. The ammonia/air mixture entering inlet 801 reacts when it reaches the ignition temperature, and thus the mixture cannot accept preheating beyond the ignition temperature. Operation is thus not subject to any possible thermal runaway. However, if the ignition and holding times are about the same, then there is a 320° C. difference between the temperatures required for ignition and for full ammonia decomposition, according to graph 700. An ammonia/air equivalence ratio of up to about 4.4 may be chosen, such that the mixture undergoes the necessary 320° C. temperature rise when it reacts. The temperature difference may be shortened, thus permitting the use of equivalence ratios greater than 4.4, by making the holding time at peak temperature longer than the ignition time. If the holding time at peak temperature is made 10 times longer than the ignition time, through choice of dimensions, then the difference, between the temperatures required for ignition and for full ammonia decomposition, shrinks to about 200° C. and an equivalence ratio of up to about 5 may be used. If the holding time at peak temperature is made 100 times longer than the ignition time, then the difference, between the temperatures required for ignition and for full ammonia decomposition, shrinks to about 100° C. and an equivalence ratio of up to about 5.7 may be used. In the extreme limit, that the temperatures required for ignition and for full ammonia decomposition are made equal, the holding time at peak temperature must be made about 300-1000 times longer than the ignition time, according to graph 700.

Figure 9:
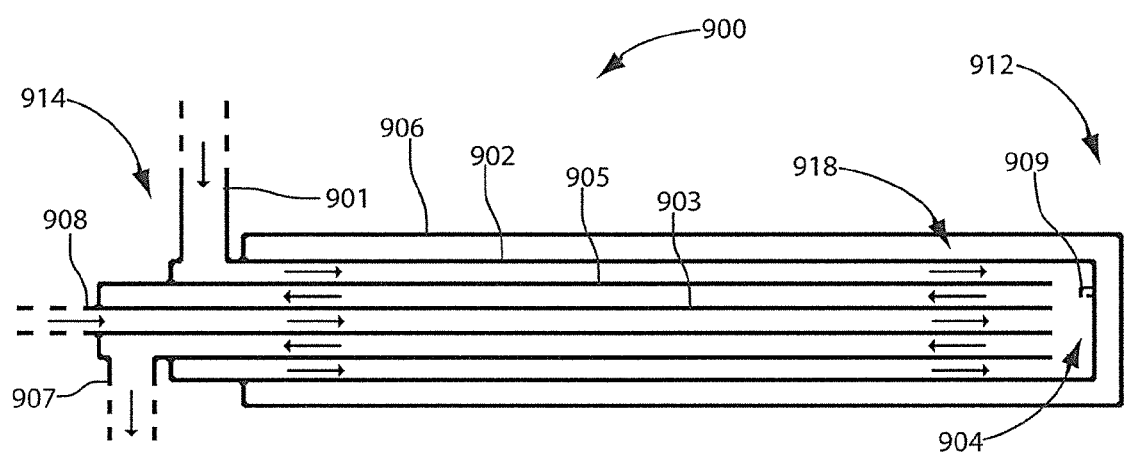
FIG. 9 is a schematic diagram of a heat exchanged Ammonia Flame Cracker, according to one representative embodiment.

Referring to FIG. 9, according to one embodiment, an Ammonia Flame Cracker 900 includes separate metering of ammonia, entering inlet 901, and air, entering inlet 908, into a combustion region 904. Separate metering prevents ignition until mixing, and thus allows the preheat temperature to approach the temperature required for full ammonia decomposition, thus obviating the need for using reduced ammonia/air equivalence ratios and/or making the holding time at peak temperature relatively very long. If pure oxygen is used instead of air, then a full ammonia decomposition yield may be obtained at equivalence ratios of up to about 6, even if the oxygen is not preheated. Most generally, at least the ammonia is preheated en-route to region 904. Preferably, the air or other oxygen-containing gas mixture entering inlet 908 is also preheated en-route to region 904, in which case the theoretical limit, corresponding to an ammonia/air equivalence ratio of 6.66, may be approached. For all discussion elsewhere herein, both the ammonia and air are preheated, and the preheat temperatures are assumed to be the same.

The ammonia, entering inlet 901, preferably does not contain any oxygen, and thus cannot ignite until it mixes with the air in region 904. The ammonia and air are preheated en-route to region 904, by heat exchange with the hydrogen-containing product mixture exiting outlet 907. A substantial portion of the ammonia may decompose during preheating, before reaching region 904. The ammonia/air mixture undergoes an additional 7° C. temperature rise above the preheat temperature, for every 1% of the ammonia decomposed before mixing with the air. The partially decomposed ammonia may combust at a peak gas temperature that is substantially higher than the preheat temperature. The energy associated with this temperature rise is recovered in the partial decomposition of the next mass of incoming ammonia. A substantial fraction, perhaps about ¼ to ⅓ or more of the ammonia, may feasibly be decomposed, before reaching region 904, thus resulting in a temperature rise of at least about 200° C. above the preheat temperature when the air reacts with the partially decomposed ammonia. The preheat temperature may be limited by the maximum temperature tolerated by materials, for example, about 1700° C. for aluminum oxide. In one example, a 200° C. temperature rise, above the 1700° C. preheat temperature, produces a peak gas temperature of 1900° C. Peak gas temperatures, possibly exceeding material durability limits, may thereby be achieved in some instances. Means of monitoring one or more temperatures, and for feedback control of the ammonia/air equivalence ratio, (not shown) may be provided as required to prevent thermal runaway and to maintain a desired set of operating temperatures.

Ammonia Flame Cracker 900 includes concentric, round tubings 902, 903, 905, and 906, and an igniter 909, similar to igniter 808. The tubings 906 and 902, 902 and 905, and 905 and 903 are joined near end 914. The construction methods and materials requirements are similar to those of corresponding tubings in Ammonia Flame Cracker 800. Ammonia enters the Ammonia Flame Cracker 900 through inlet 901 and travels through the space between tubings 902 and 905 until the ammonia reaches region 904. Air enters through inlet 908 and travels through the space within tubing 903 until it reaches region 904. The ammonia and air mix and combust in region 904, wherein the mixture becomes a hydrogen-containing product mixture. Finally, the hydrogen-containing product mixture travels toward exit 907, through the space between tubings 905 and 903, and leaves the Ammonia Flame Cracker 900 through exit 907. The small arrows show the direction of flow. The Ammonia Flame Cracker 900 is operable under other permutations of the reactant entries and product exit.

Tubing 906 is joined to tubing 902 near end 914 and it forms the outer wall of a vacuum jacket, and tubing 902 forms the inner wall of this same vacuum jacket. Vacuum space 918 is thus bounded by the inner surface of tubing 906 and the outer surface of tubing 902. This vacuum space prevents conductive and convective heat loss from Ammonia Flame Cracker 900. Other description of the vacuum jacket is the same for Ammonia Flame Cracker 900 as it is for Ammonia Flame Cracker 800.

A flammable starting mixture, possibly consisting of a hydrogen-containing gas mixture entering inlet 901 and air entering inlet 908, or ammonia entering inlet 901 and pure oxygen or oxygen-enriched air entering inlet 908, may be ignited, by the igniter 909, and burned in region 904, and the burned gases may be purged through toward end 914, thus warming surfaces within the Ammonia Flame Cracker 900 up to operating temperature. In some cases, leftover hydrogen, contained in this burned starting mixture, may be applied to further uses during warm-up. After warm-up is achieved, operation may revert to a rich mixture of ammonia entering inlet 901, and air entering inlet 908. Otherwise, an electric heater (not shown) may be used for warming surfaces of the Ammonia Flame Cracker 900 up to operating temperature.

Figure 10:
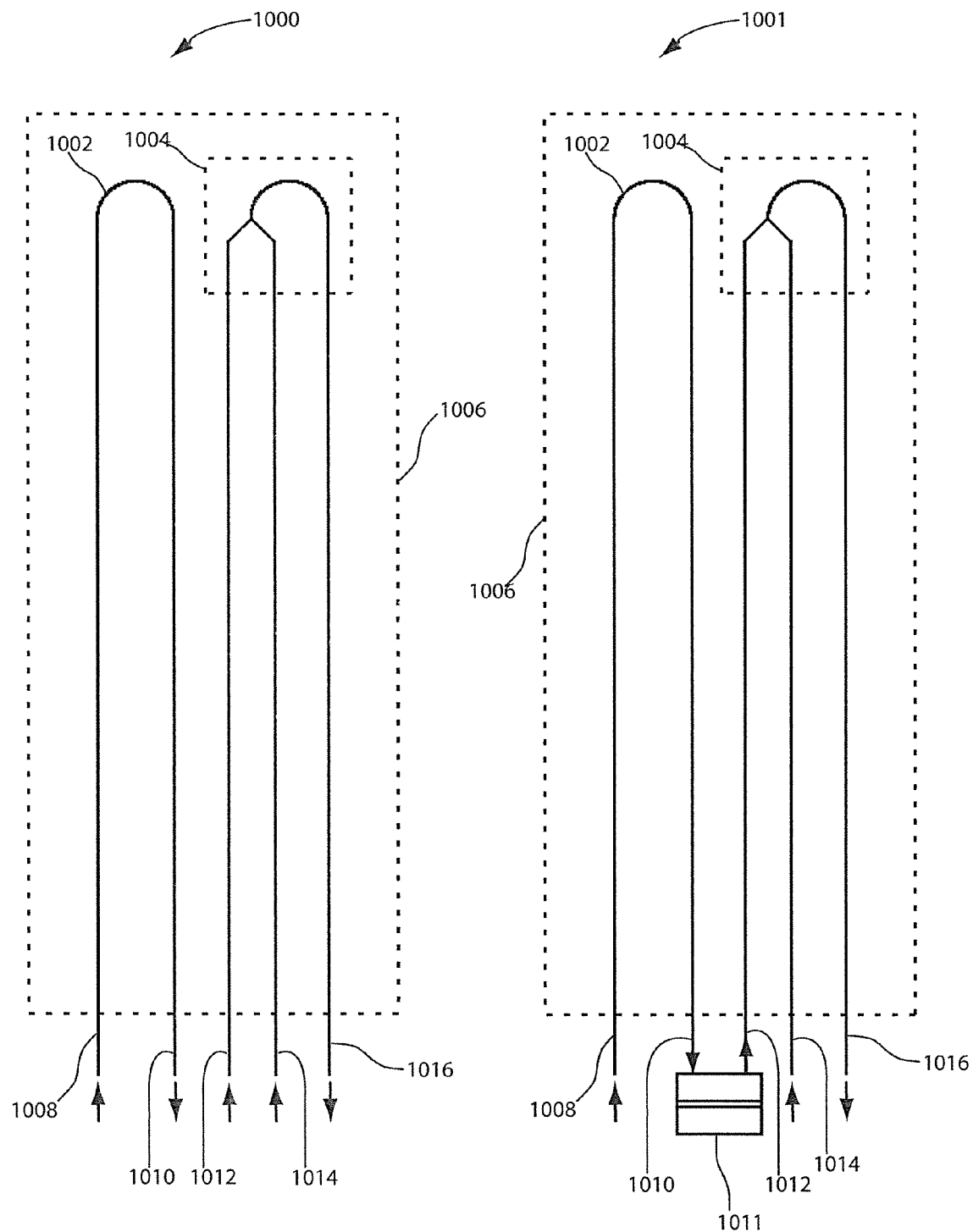
FIG. 10 is. is a schematic diagram of a heat exchanged Ammonia Flame Cracker, according to one representative embodiment.

Referring to FIG. 10, a heat exchanged Ammonia Flame Cracker 1000 with separate ammonia combustion and ammonia decomposition conduits, and system 1001 are shown. Separate conduits may be used for obtaining a hydrogen product which is devoid of water and of reduced nitrogen content, or for operating a fuel cell. The theoretical upper performance limits concerning energy balance, overall equivalence ratio, and efficiency are all the same, regardless of whether ammonia is combusted and decomposed in separate conduits, or within the same conduit.

Ammonia enters port 1008, and is brought up to a temperature generally higher than 1400° C. The ammonia decomposes in the endothermic decomposition conduit 1002, and then the hydrogen-containing gas mixture is brought back down in temperature before exiting port 1010. If the ammonia fully decomposes in conduit 1002, then the mixture exiting port 1010 will contain 75% hydrogen and 25% nitrogen by volume. A fuel enters port 1012 and air enters port 1014. The fuel may be ammonia, or it may be another fuel stored separately from the ammonia, or it may be a portion of the hydrogen-containing mixture exiting from port 1010. The fuel and air are preheated separately, then mixed and burned in a burner 1004. The burner 1004 may mix the fuel and air in a distributed way, such that the heat release is spread out, thus lowering peak temperatures in the burner 1004 and facilitating heat transfer from burner 1004 to endothermic decomposition conduit 1002. Heat is recovered from the exhaust gas after it leaves the burner 1004, and before the exhaust gas exits from port 1016. The arrows show the direction of flow. The temperature, in the heat exchanger 1006, has an approximately uniform gradient with respect to vertical height, such that hotter items are higher on the vertical axis, and the items at a given vertical height will be approximately the same temperature.

At least enough air is supplied to the burner 1004 such that all of the fuel is combusted, and more than sufficient air may be used for the purposes of balancing the heat capacities between the exothermic conduit containing the burner 1004 and the endothermic conduit 1002, for reducing NO emissions by the burner 1004, for lowering peak temperatures in the burner 1004, or to ensure the complete burn-up of the fuel entering port 1012. The fuel entering port 1012 and air entering port 1014 may be mixed in stoichiometric proportions in burner 1004, such that any small quantities pollutants in the exhaust gas may be completely removed with an exhaust cleanup catalyst (not shown) before exiting port 1016. Heat is recovered from the exhaust gas after it leaves the burner 1004, and before it exits from port 1016. Generally, a heat exchange relationship may exist between any two or all flow paths or other elements contained within the heat exchanger 1006. In particular, heat is transferred from the burner 1004 to the endothermic decomposition conduit 1002.

Ammonia Flame Cracker 1000 may be operated as a stand-alone device or it may be incorporated into an engine system or other system for supplying hydrogen to a hydrogen-consuming apparatus. Ammonia Flame Cracker 1000 may be further used in applications requiring a hydrogen-containing product gas, which is devoid of moisture and residual oxygen.

The ammonia, entering the endothermic conduit 1002 at inlet 1008, may be counterflow heat exchanged with the gas mixture, exiting at outlet 1010. The conduit 1002 is operable, for non-catalytically decomposing ammonia, using any heat source that delivers heat at a temperature higher than 1400° C. A resistively heated, electric element or electric arc could be used, instead of the burner 1004, for heating the conduit 1002 or for heating the gas within the conduit 1002.

Ammonia Flame Cracker 1000 may be incorporated into a fueling system 1001 for a fuel cell 1011. Ammonia enters port 1008, and the ammonia is at least partially decomposed in conduit 1002. The hydrogen gas mixture, exiting from port 1010, is fed into the fuel cell 1011. At least a portion of the hydrogen is consumed by the fuel cell 1011, and the hydrogen-depleted mixture is used as the fuel, which enters port 1012. This hydrogen-depleted mixture which is retrieved from a fuel cell, after at least some of the hydrogen is consumed, is known to the art as an "anode off-gas". System 1001 may be operated toward the advantages that none of the fuel is wasted, no gas separators are needed, Ammonia Flame Cracker 1000 and system 1001 may be fully non-catalytic, impurities do not accumulate in the fuel cell 1011, throughput is not limited by quantity of catalyst, and the Ammonia Flame Cracker 1000 and system 1001 may be operated with ammonia and air as the only inputs. Ammonia Flame Cracker 1000 and system 1001 may be started by resistive heating of one or more elements contained in the heat exchanger 1006, or by combustion of flammable mixtures of ammonia and/or other fuels with air and/or with other oxidizers in the burner 1004. The burner 1004 may include an igniter, (not shown) which may be a spark gap, a traveling flame, or any of the various other igniters known to the art.

Ammonia Flame Crackers 800, 900 and 1000 may be warmed up to operating temperature by combustion of a starting mixture and then flowing the combusted starting mixture over surfaces of Ammonia Flame Crackers 800, 900 and 1000. Mixtures of ammonia and pure oxygen or oxygen-enriched air are flammable at a wide range of temperatures, and thus may be used as starting mixtures. Gas mixtures containing elevated concentrations of oxygen may be obtained by pressure swing adsorption, or by any other means known to the art for obtaining oxygen.

The inclusion of an oxygen extractor, which provides oxygen for starting, may be more burdensome or expensive than the inclusion of an ammonia decomposer that provides hydrogen for starting. Hydrogen may be used for rendering flammable, a comparatively larger mass of starting mixture consisting mostly of ammonia and air. The ammonia decomposer that provides hydrogen for starting may be selected from any of the ammonia decomposers disclosed herein or known to the art. The hydrogen and ammonia (fuel) component and air component of the starting mixture may be metered together into inlet 801 of Ammonia Flame Cracker 800. The fuel and air components of the starting mixture may be metered separately into inlets 901 and 908, respectively, of Ammonia Flame Cracker 900. The fuel and air components of the starting mixture may be metered separately into inlets 1012 and 1014, respectively, of Ammonia Flame Cracker 1000. Ammonia Flame Crackers 800, 900 and 1000 may thus be started, using ammonia, air and electricity as the only inputs. The ammonia decomposer that provides hydrogen for starting may optionally be incorporated within Ammonia Flame Crackers 800, 900 and 1000.

In one example, a near-stoichiometric starting mixture consisting of air and ¼ decomposed ammonia is flammable at a wide range of temperatures. As the temperatures increase during warm-up, it is permitted to either increase the total flow of the starting mixture, to increase the ratio of ammonia to hydrogen in the starting mixture, or to increase the overall richness of the mixture. Any of these may be achieved by holding the hydrogen flow constant, and increasing the ammonia flow, while possibly also increasing the air flow, to the extent permitted by the increasing warm-up temperatures. In each case, the ammonia flow may optionally be increased during warm-up. Ammonia Flame Crackers 800, 900 and 1000 may thereby be quickly started even on a small flow of hydrogen, and a correspondingly small consumption of electric power by the ammonia decomposer that provides hydrogen for starting. An exclusively electrically powered ammonia decomposer may be used for starting when it is desired to obtain a maximally flammable starting mixture, which is devoid of water, and of minimal inert gas content. The electrically powered ammonia decomposer may contain a resistively heated element, which may be catalytic, and which is immersed in flowing ammonia, without oxygen. Additional ammonia, destined for inclusion in the starting mixture, may bypass the ammonia decomposer.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Having described our invention, we claim:

1. An ammonia cracker, comprising:
    a source of gaseous ammonia;
    a counterflow heat exchanger having a first inlet for receiving the ammonia from the source, and a separate, second inlet for receiving an oxygen-containing gas mixture;
    a combustion zone within the counterflow heat exchanger;
    apparatus for separately metering the ammonia and the oxygen-containing gas mixture into the combustion zone such that the ammonia and the oxygen-containing gas mixture are burned at a maximum gas temperature higher than 1400° C., thus forming a mixture of products including non-combusted hydrogen gas;
    wherein at least the incoming ammonia is preheated prior to combustion, with a portion of the preheating resulting from a transfer of heat from the mixture of products to the incoming ammonia; and
    an outlet for expelling the mixture of products, including the non-combusted hydrogen gas.

2. The ammonia cracker of claim 1, wherein the gas mixture is burned at a maximum gas temperature of about 1500-1800° C.

3. The ammonia cracker of claim 1, further comprising:
a processor programmed with an algorithm for controlling the ammonia/oxidizer equivalence ratio, of the incoming mixture components, such that a desired ammonia decomposition yield is obtained.

4. The ammonia cracker of claim 1, further comprising:
a temperature probe for monitoring an operating temperature; and
a processor programmed with an algorithm for controlling the ammonia/oxidizer equivalence ratio, of the incoming mixture components, such that a desired operating temperature is obtained.

5. The ammonia cracker of claim 1, further comprising:
starting apparatus for heating at least a portion of the counterflow heat exchanger, or one or more components within or attached to the counterflow heat exchanger, up to operating temperature during a starting period; and
wherein the heating, during the starting period, includes one or more of the following: application of electric power to the starting apparatus, application of electric power to a portion of the counterflow heat exchanger, or application of electric power to at least one of the following: a component within the counterflow heat exchanger, a component attached to the counterflow heat exchanger, or a component in communication with the counterflow heat exchanger.

6. The ammonia cracker of claim 1, further comprising:
starting apparatus for heating at least a portion of the counterflow heat exchanger, or one or more components within or attached to the counterflow heat exchanger, up to operating temperature during a starting period; and
wherein the heating, during the starting period, includes combustion of a starting mixture and then flowing the combusted starting mixture over at least one of the following: a surface of the counterflow heat exchanger, a surface within the counterflow heat exchanger, or a surface attached to the counterflow heat exchanger.

7. The ammonia cracker of claim 6, wherein the starting mixture contains hydrogen and air.

8. The ammonia cracker of claim 6, wherein the starting mixture also contains ammonia.

9. The ammonia cracker of claim 7, wherein the hydrogen, in the starting mixture, is obtained by decomposition of ammonia.

10. The ammonia cracker of claim 8, wherein the flow of ammonia, in the starting mixture, is increased during a portion of the starting period.

11. The ammonia cracker of claim 6, wherein the starting mixture contains ammonia and oxygen.

* * * * *